United States Patent [19]
Kosikowski

[11] 3,975,544
[45] Aug. 17, 1976

[54] FLAVOR DEVELOPMENT BY ENZYME PREPARATION IN NATURAL AND PROCESSED CHEDDAR CHEESE

[75] Inventor: Frank V. Kosikowski, Ithaca, N.Y.

[73] Assignee: Cornell University, Ithaca, N.Y.

[22] Filed: May 10, 1974

[21] Appl. No.: 468,862

[52] U.S. Cl. .................................. 426/35; 426/37; 426/42; 426/61; 426/63; 426/582
[51] Int. Cl.² ........................................ A23C 19/12
[58] Field of Search ................. 426/33, 35, 34, 36, 426/37, 38, 42, 56, 63, 188, 361, 61, 582, 43

[56] References Cited
UNITED STATES PATENTS

| | | | |
|---|---|---|---|
| 2,531,329 | 11/1951 | Farnham | 426/63 X |
| 2,793,122 | 5/1957 | Erekson | 426/36 |
| 2,965,492 | 12/1960 | Bauman et al. | 426/36 |
| 3,295,991 | 1/1967 | Cort et al. | 426/38 X |
| 3,446,627 | 5/1969 | Noznick et al. | 426/36 |
| 3,650,768 | 3/1972 | Roberts | 426/35 |

*Primary Examiner*—Raymond N. Jones
*Assistant Examiner*—R. A. Yoncoskie
*Attorney, Agent, or Firm*—Lawrence E. Laubscher; Theodore C. Wood; Ralph R. Barnard

[57] ABSTRACT

A method was developed for producing cheddar cheese from pasteurized milk characterized by the addition of enzyme preparations to the cheddared curds prior to curing. An enzyme mixture of food grade lipase, microbial and animal, and neutral protease is added to substantially reduce the curing time of the cheese and at the same time impart the appropriate cheddar cheese flavor with minimum bitterness and rancidity. Optionally, peptidase enzyme may be added.

5 Claims, No Drawings

FLAVOR DEVELOPMENT BY ENZYME PREPARATION IN NATURAL AND PROCESSED CHEDDAR CHEESE

This invention relates to an improved method for obtaining cheddar cheese from pasteurized milk in a greatly shortened period of time, characterized by the introduction of certain food grade microbial and animal enzyme preparations into the cheese curds from which the whey has been drained.

Commonly known methods for producing cheddar cheese are described in detail in *Cheese and Fermented Milk Foods* by Frank Kosikowski, Edward Brothers, Inc., 1970, which is incorporated by reference in its entirety. Briefly, cheddar cheese from pasteurized milk is produced by adding active lactic starter (about 0.5–1.0% by weight) to the warm (88°F) milk in a cheese vat, and the milk is allowed to ripen for about 15–60 minutes at this temperature. During this period the starter organisms acclimate themselves to their new environment in preparation for rapid growth and a small but critical amount of lactic acid is produced.

Single-strength rennet extract, diluted 1:40 with water, is added to the ripened milk at about 90 ml. extract to 1,000 lb. milk, mixed for about 5 minutes, and let stand for about 25 minutes for rennet action to form a curd. The lactic acid produced by the lactic starter activates the rennin enzyme.

The curd is then cut into cubes, and the cut curd mass is stirred while the temperature is increased over a 30-minute period to about 100°F and cooked with occasional agitation for about 45 minutes more.

Agitation is then stopped permitting the curds to settle after which the whey is drained off. The curds are trenched over the length of the vat, allowed to mat and then cut into blocks.

The cheddaring period follows in which the blocks are turned over repeatedly at about 15-minute intervals until the whey continuously running from the vat reaches an acidic pH of 5.2–5.3.

Following the cheddaring step, the curd slabs are fed into a milling machine after which the cut curds are stirred. During stirring coarse cheese salt is added (2.3 lb/100 lb. cheese curd).

The salted curds are then hooped and pressed overnight at about 20 to 25 p.s.i.g. and then placed on shelves in a drying foom for 3 to 4 days. The room is maintained at about 60°F. and 70–80% humidity, and the cheese is turned on the shelves daily.

Finally, the whole cheese is paraffined or rindless wrapped and cured, preferably 9 to 12 months, in a room maintained at about 36°F, or higher, and 85% humidity.

Rapid inducement of typical flavor in cheddar cheese has received considerable research attention. (A. C. Dahlberg and F. V. Kosikowski, 1947, "The Flavor, Volatile, Acidity and Soluble Protein of Cheddar and Other Cheeses", *J. Dairy Sci.*, 30:165; D. A. Forss and S. Patton, 1966, "Flavor of Cheddar Cheese", *J. Dairy Sci.*, 49:89; F. V. Kosikowski, 1957 "Flavors of Processed Foods, Cheese Flavors", Proceedings of Symposium on the Chemistry of Natural Food Flavors, *Nat. Acad. Sci.*, Washington, D.C.; L. A. Mabbit, 1961, "The Flavor of Cheddar Cheese", *J. Dairy Res.*, 28:303). The influence of the lactic streptococci from cheese starters was investigated by Reiter el al., McDonald and Perry (B. Reiter et al., 1967, "The Effect of the Microbial Flora on the Flavor and Free Fatty Acid Composition of Cheddar Cheese", *J. Dairy Res.*, 34:257; I. J. McDonald, 1964, "Characteristics of Proteinases of Three Strains of Staphylococcus Lactis Isolated From Cheddar Cheese", *J. Dairy Res.*, 31:147; K. D. Perry, 1961, "A Comparison of the Influence of Streptococcus Lactis and Str. Cremoris Starters in the Flavor of Cheddar Cheese", *J. Dairy Res.*, 28:221).

Attempts have also been made to impart cheddar cheese flavor to bland curds by adding pure amino acids, fatty acids or synthetic mixtures of identified volatiles to cheese or cheese slurries (G. J. Silverman and F. V. Kosikowski, 1953, "Observations on Cheese Flavor Production by Pure Compounds", *J. Dairy Sci.*, 36:574; and S. Singh et al., 1969, "Factors Affecting Flavor Development in Cheddar Cheese Slurries", *J. Dairy Sci.*, 53:533).

Animal and plant lipase-induced cheese flavor has been reported by Babel and other investigators. (F. B. Babel, 1945, "Fat Degradation in Cheddar Cheese Made from Pasteurized Milk Without and With Added Lipase", *J. Dairy Sci.*, 28:201; J. W. Harper, 1956, "Lipase Systems Used in the Manufacture of Italian Cheese II Selective Hydrolysis", *J. Dairy Sci.*, 40:556; G. H. Richardson et. al., 1970, "Gastric Lipase Characterization and Utilization in Cheese Manufacture", *J. Dairy Sci.*, 54:643). Richardson et al. applied gastric lipase preparations in cheese milk for the manufacture of cheddar and provolone cheeses, which were organoleptically preferred. Often, however, the resulting flavors of cheese to which enzymes have been added were accompanied by strong bitterness.

Orla-Jensen suggested the potential importance of microbial enzymes to cheese flavor; but relatively little activity to purposely induce cheese flavor with enzyme preparations has occurred, perhaps because of lack of proper enzyme systems. (S. Orla-Jensen, 1939, "The Ripening Process of Hard Cheese", *Proc. 3rd Int. Congress of Microbiology*). Kosikowski referred to preliminary experiments dealing with the addition of amino acid, decarboxylase enzyme systems from enterococci cells to cheddar cheese curds in attempts to develop flavor. (F. V. Kosikowski, 1957, "Flavors of Processed Foods, Cheese Flavors", Proceedings of Symposium on the Chemistry of Natural Food Flavors, *Nat. Acad. Sci.*, Washington, D.C.

Accordingly, a primary object of the present invention is to produce from pasteurized milk in a shorter period of time than normal a high-quality cheddar cheese product in that there is introduced into the cheese curds a mixture of enzymes comprising food grade lipase enzyme (microbial and/or animal lipase enzyme), neutral protease enzyme and salt. Optionally, food grade peptidase enzyme may also be included in the mixture. In one embodiment the resultant product is hooped and pressed, dried and finally cured for about 1 month. In a second embodiment, the enzyme mixture is added to a previously prepared cheddar cheese and cured. This accelerated ripened product has utility as a flavoring ingredient which may be incorporated into mild processed cheddar cheese containing no enzyme mixture to raise it flavor to medium sharp or sharp levels.

Another object of the invention is to provide an enzyme and salt mixture for use in the production of cheddar cheese from milk which mixture comprises food grade lipase enzyme (microbial and/or animal), neutral protease enzyme and sodium chloride and optionally peptidase enzyme. This mixture is adapted for use with a cheddar cheesemaking process to produce a high flavor cheese product in a greatly reduced period of time.

Other objects and advantages of the invention will become apparent from the following specification.

In accordance with the present invention a mixture of at least two enzymes, namely, food grade lipase and neutral protease, are added along with the salt to the cheddared cheese curds after the curds have been milled and before the curd is molded. Optionally, peptidase enzyme may also be included in the enzyme mixture.

It has been discovered that by incorporating this enzyme mixture into the cheddared cheese curds the curing time may be reduced to no more than 1 month. This product has a typical cheddar cheese flavor with minimum bitterness and rancidity. Prior art methods for producing cheddar cheese normally require a curing period of about 4 to 12 months before optimum cheddar cheese flavor is obtained.

The lipase enzyme may be either an animal lipase enzyme or microbial lipase enzyme or both. The animal lipase enzyme is produced from an edible animal tissue. The microbial lipase enzyme is derived from a mold, Aspergilli ssp., although other species like Penicillium ssp. or Rhizopus ssp. may be used. Examples of species are *Aspergillus oryzae, Aspergillus niger, Penicillium roqueforti, Penicillium glaucum* and *Rhizopus oryzae.*

The neutral protease enzyme of the enzyme mixture is derived from a mold, Aspergilius ssp., although other species like Mucor ssp., Penicillium ssp., Rhizopus ssp. or Streptomyces ssp. may be used.

The peptidase enzyme, which optionally may be included in the enzyme mixture, is also derived from a mold, Aspergilli ssp. Streptomyces ssp., Pencillium ssp., or Rhizopus ssp. may be used.

The amount of enzyme mixture added is sufficient to substantially reduce the time required for curing the cheddar cheese. Preferably, the lipase enzyme is added in an amount ranging between 2 and 20 grams per 100 kgs. of cheese curds, and the neutral protease enzyme is added in an amount ranging between 5 and 50 grams per 100 kgs. of cheese curds. If peptidase enzyme is included in the mixture, the combination of the neutral protease and peptidase enzymes should together be in the range between 5 and 50 grams per 100 kgs. of cheese curds.

Ideally, the food grade enzyme mixture is mixed with the coarse cheese salt and the enzyme-salt mixture is then added to the cheddared cheese curd. Preferably, the enzyme-salt mixture should contain, by weight, 1 to 4% lipase enzyme, 2 to 8% protease enzyme and 97 to 88% sodium chloride. If the peptidase enzyme is also included, then the combination of the neutral protease enzyme and peptidase enzyme will amount to between 2 and 8% of the enzyme-salt mixture.

In another embodiment of the present invention, cheddar cheese produced in accordance with the present invention and including the food grade enzyme mixture may be added to processed cheddar cheese containing no enzyme mixture to increase flavor. Adding only 10% of the enzyme mixture containing cheese (cured for 1 month) to the mild processed cheese stock gave the finished processed cheese a good quality with a medium cheese flavor.

The following examples illustrate the improved results obtained with the present invention.

EXAMPLE I

1. Ripening the Milk

Milk pasteurized at 72°C for 16 sec. was placed in a cheese vat and 0.5% of active lactic starter was added while mixing. The milk temperature was adjusted to 88°F and annato cheese color was added (15 ml./1,000 lb. milk). The starter remained in contact with the milk for between 15 and 30 minutes.

2. Setting the Milk

Single-strength rennet extract (90 ml./1,000 lb. milk) diluted with tap water in the ratio of one part extract to 40 parts water was added to the milk. After agitating for about 5 minutes the milk was held quiescent for about 25 minutes to allow time for rennet action to form a curd.

3. Cutting the Curd

When the curd reaches the required strength, it was cut into cubes using ¼ inch wire cheese knives. The cut curd mass was then stirred for about 5 minutes at slow speed.

4. Cooking the Curds

Cooking the curds was started gradually using steam in the cheese vat jacket until a peak temperature of 100°F was attained over a period of about 30 minutes. At the same time there was steady agitation. The temperature was then maintained for about 45 minutes with intermittent agitation.

5. Draining the Whey

Agitation was stopped permitting the curds to settle. A strainer was inserted in the exit gate, and while the curds were pushed through the whey to the end of the vat with a curd rake, the greenish colored whey was drained off. The curds were trenched over the length of the vat during the latter part of the curd draining.

6. Cheddaring the Curd

The trenched curd was allowed to mat for about 15 minutes after removal of the whey and then was cut into blocks which were spaced about 1 inch apart. After about 15 minutes, the curd blocks were turned over repeatedly at 15-minute intervals, and during the latter part of this period the curd blocks were piled double. The cheddaring process continued until the titratable acidity of the clear whey exiting from the vat reached 0.5–0.6%.

7. Milling the Curd Slabs

The flattened-out curd slabs were fed into a milling machine, and the milled curds were returned to the vat.

8. Adding the Enzyme-Salt Mixture to the Curds

The milled curds were mechanically forked while spreading a mixture of cheese salt and food grade enzymes over the curds. The cheese was mechanically forked for a period of about 30 minutes.

The salt-enzyme mixture contained:

Sodium Chloride — 2.3 lb./100 lb. cheese curds;
Animal lipase enzyme preparation — 2–20 gm./100 kgs. cheese curds;
Neutral protease enzyme preparation — 5–50 gm./100 kgs. cheese curds.

9. Hooping and Pressing

The cheese curds were placed in metal molds or hoops and maintained in a hydraulic press overnight at a pressure of about 20–25 p.s.i.g.

10. Drying the Cheese

After removing the whole cheese from each of the hoops, they were placed on shelves in a drying room for 3 to 4 days, the room being maintained at about 60°F and 75% humidity. The cheese was turned daily on the shelves unless packaged in rindless wrappers.

11. Curing the Cheese

Each whole cheese was paraffined or rindless wrapped and then they were cured for 1 month at 10°–25°C.

EXAMPLE II

The same process set forth in Example I was repeated except that microbial lipase enzyme derived from Aspergilli ssp. was substituted for the animal lipase enzyme preparation.

EXAMPLE III

The same process set forth in Example II was repeated except that peptidase enzyme was added to the enzyme mixture, the peptidase enzyme preparation being derived from Aspergilli ssp.

The flavor qualities and intensities of the cheese products produced in accordance with Examples I, II and III were compared by experienced judges using the American Dairy Science Association scorecard for cheddar cheese but typical cheese flavor, bitterness and rancidity were evaluated on a scale of 0 to 5. The following were the results of these tests:

| Examples I and II: | Range from various Enzyme Preparations |
|---|---|
| Cheese flavor | 4.0 – 5.0 |
| Bitterness | 1.0 – 2.0 |
| Rancidity | 2.0 – 4.5 |
| Example III:* | |
| Cheese flavor | 4.5 – 5.0 |
| Bitterness | 0.5 |
| Rancidity | 3.0 – 4.0 |

*where 5.0 indicated maximum flavor and 0 indicated none

It is readily apparent that at the end of only one month of curing, a number of the cheddar cheeses had a high level of typical cheese flavor and at the same time minimum bitterness and acceptable rancidity. Some rancidity enhances typical cheese flavor.

What is claimed is:

1. In the method of producing cheddar cheese from pasteurized milk wherein cheddared cheese curds are prepared and the curds are then molded, dried and cured, the improvement comprising introducing into the cheddared cheese curds a mixture comprising:
   a. food grade animal lipase enzyme derived from edible animal tissue,
   b. food grade neutral protease enzyme derived from a mold selected from the group consisting of Aspergilli ssp., Mucor ssp., Penicillium ssp., Rhizopus ssp. and Streptomyces ssp.,
   c. food grade peptidase enzyme derived from a mold selected from the group consisting of Aspergilli ssp., Streptomyces ssp., Penicillium ssp. and Rhizopus ssp., and
   d. sodium chloride,
   e. the amount of said lipase enzyme in said mixture being in the range to provide between 2 and 20.0 grams per 100 kg. of cheese curds, the amount of the combination of said neutral protease enzyme and peptidase enzyme in said mixture being in the range to provide between 5 and 50 grams per 100 kg. of curds and said sodium chloride being between 97 and 88% by weight of said mixture to substantially reduce the time required for curing said cheese while obtaining optimum cheese flavor and minimum bitterness and rancidity.

2. The method of claim 1 wherein said curing step is conducted for a maximum of 1 month.

3. An enzyme and salt mixture for use in the production of cheddar cheese from pasteurized milk which comprises:
   a. food grade lipase animal enzyme powder derived from edible animal tissue in an amount of 1 to 4% by weight of said mixture,
   b. food grade neutral protease enzyme powder derived from a mold selected from the group consisting of Aspergilli ssp., Penicillium ssp., Rhizopus ssp., Muccor ssp., and Streptomyces ssp.,
   c. food grade peptidase enzyme derived from a mold selected from the group consisting of Aspergilli ssp., Streptomyces ssp., Penicillium ssp., and Rhizopus ssp., the combination of neutral protease enzyme and peptidase enzyme being in an amount between 2% and 8% by weight of said mixture, and
   d. sodium chloride in a dry state, said sodium chloride being between 97 and 88% by weight of said mixture.

4. In the method of producing cheddar cheese from pasteurized milk wherein cheddared cheese curds are prepared and the curds are then molded, dried and cured, the improvement comprising introducing into the cheddared cheese curds a mixture comprising:
   a. food grade neutral microbial lipase derived from a mold selected from the group consisting of Aspergilli ssp., Pencillium ssp. and Rhizopus ssp.,
   b. food grade neutral protease enzyme derived from a mold selected from the group consisting of Aspergilli ssp., Mucor ssp., Penicillium ssp., Rhizopus ssp., and Streptomyces ssp.,
   c. food grade peptidase enzyme derived from a mold selected from the group consisting of Aspergilli ssp., Streptomyces ssp., Penicillium ssp. and Rhizopus ssp., and
   d. sodium chloride,
   e. the amount of said lipase enzyme in said mixture being in the range to provide between 2 and 20.0 grams per 100 kg. of cheese curds, the amount of the combination of said neutral protease enzyme and peptidase enzyme is said mixture being in the range to provide between 5 and 50 grams per 100 kg. of curds and said sodium chloride being between 97 and 88% by weight of said mixture to substantially reduce the time required for curing said cheese while obtaining optimum cheese flavor and minimum bitterness and rancidity.

5. An enzyme and salt mixture for use in the production of cheddar cheese from pasteurized milk which comprises:
   a. food grade neutral microbial lipase derived from a mold selected from the group consisting of Aspergilli ssp., Penicillium ssp. and Rhizopus ssp., in an amount of 1 to 4% by weight of said mixture, b. food grade neutral protease enzyme powder derived from a mold selected from the group consisting of Aspergilli ssp., Penicillium ssp., Rhizopus ssp., Mucor ssp., and Streptomyces ssp., c. food grade peptidase enzyme derived from a mold selected from the group consisting of Aspergilli ssp., Streptomyces ssp., Penicillium ssp. and Rhizopus ssp., the combination of neutral protease enzyme and peptidase enzyme being in an amount between 2 and 8% by weight of said mixture, and d. sodium chloride in a dry state, said sodium chloride being between 97 and 88% by weight of said mixture.

* * * * *